US006354703B1

(12) United States Patent  
Sadler

(10) Patent No.: US 6,354,703 B1
(45) Date of Patent: Mar. 12, 2002

(54) EYEGLASS DEVICES HAVING AUXILIARY EYEGLASSES WITH MAGNETIC CLAMP MOUNTING

(75) Inventor: Frank Sadler, Lexington, KY (US)

(73) Assignee: Sadler Inventions, Inc., Lexington, KY (US)

( * ) Notice: Subject to any disclaimer, the term of this patent is extended or adjusted under 35 U.S.C. 154(b) by 0 days.

(21) Appl. No.: 09/707,642

(22) Filed: Nov. 7, 2000

(51) Int. Cl.[7] ................................................. G02C 7/08
(52) U.S. Cl. ............................................ 351/57; 351/47
(58) Field of Search ..................................... 351/47, 57

(56) References Cited

U.S. PATENT DOCUMENTS

| 5,416,537 A | 5/1995 | Sadler |
| 5,568,207 A | 10/1996 | Chao |
| 5,642,177 A | 6/1997 | Nishioka |
| 5,737,054 A | 4/1998 | Chao |
| 5,786,880 A | 7/1998 | Chao |
| 5,877,838 A | 3/1999 | Chao |
| 5,882,101 A | 3/1999 | Chao |
| 5,883,689 A | 3/1999 | Chao |
| 5,936,700 A | 8/1999 | Masunaga |
| 5,940,162 A | 8/1999 | Wong |
| 5,975,691 A | 11/1999 | Ku |
| 6,012,811 A | 1/2000 | Chao |
| 6,027,214 A | 2/2000 | Graham |
| 6,053,611 A | 4/2000 | Ku |

FOREIGN PATENT DOCUMENTS

JP 9-101489 * 4/1997 ................... 351/47

* cited by examiner

Primary Examiner—Huy Mai
(74) Attorney, Agent, or Firm—King and Schickli, PLLC

(57) ABSTRACT

A combination eyeglass device is provided which includes eyeglasses having primary lenses and adapted to fit on the user's head. The eyeglass device also has auxiliary eyeglasses having secondary lenses, which approximately correspond to the dimension and shape of the primary lenses. In addition, the eyeglass device has two pairs of magnetic clamps adapted to grip the eyeglasses adjacent the periphery of the primary and the secondary lenses. The clamps are attached to the primary eyeglasses so that they correspond to the positions of the clamps attached to the auxiliary eyeglasses. The clamps may be magnetically mated with each other to securely hold the auxiliary eyeglasses on the primary eyeglasses. Each of the clamps includes a retainer in the form of a screw and/or a resilient web. A deformable plastic coating on the inside of the jaws may be used to enhance the gripping function. A conversion kit includes auxiliary eyeglasses and at least one magnetic clamp for attaching the auxiliary eyeglasses to the primary eyeglasses.

20 Claims, 2 Drawing Sheets

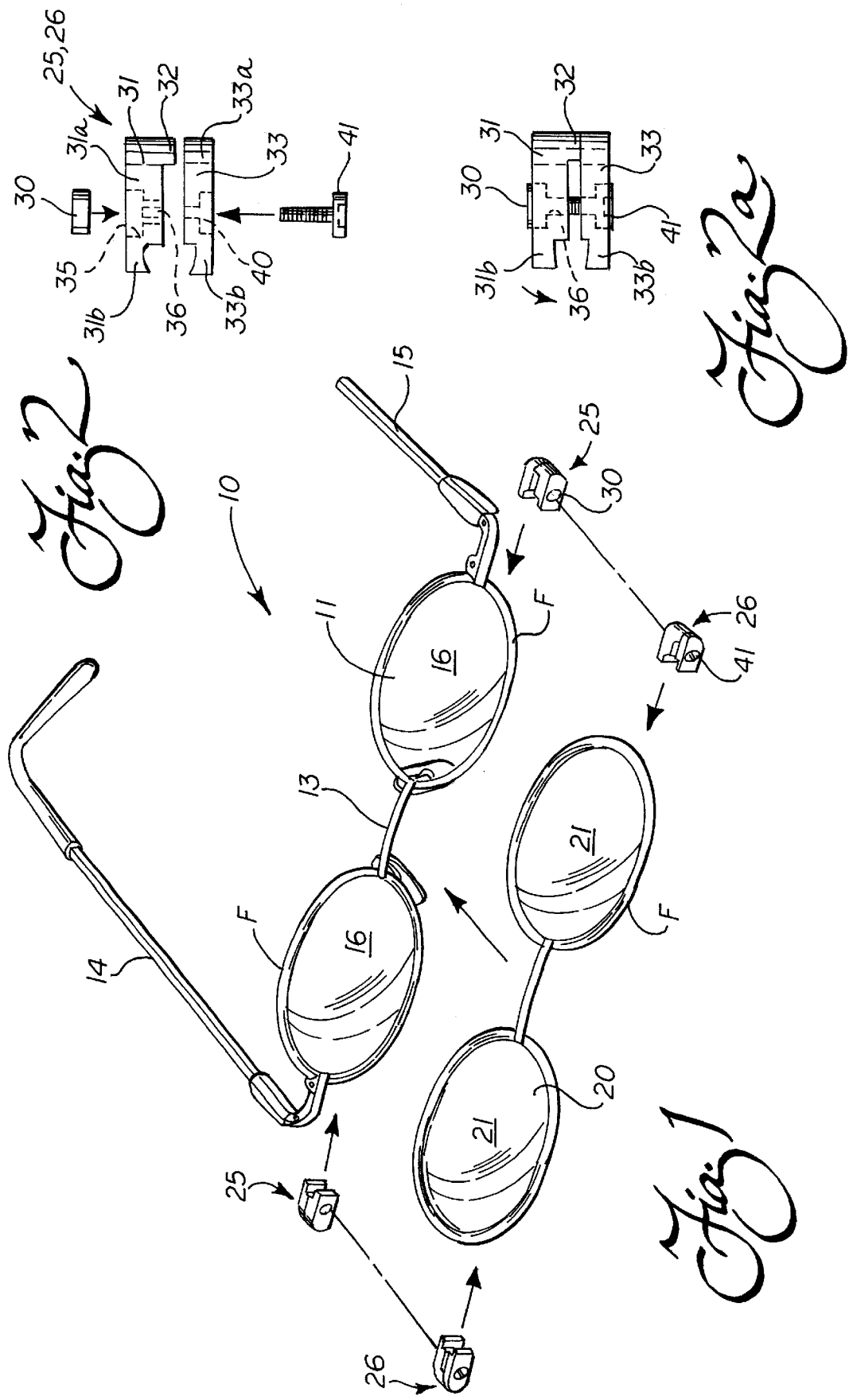

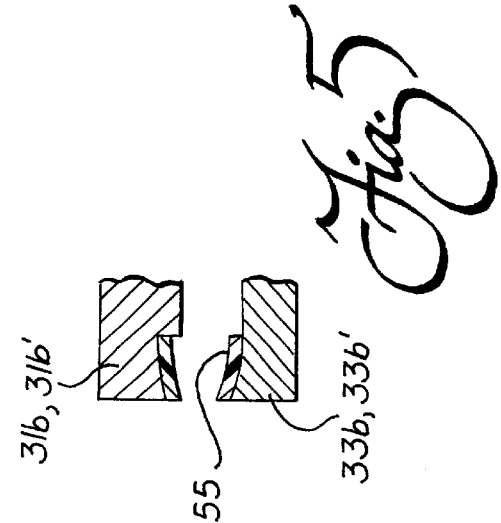
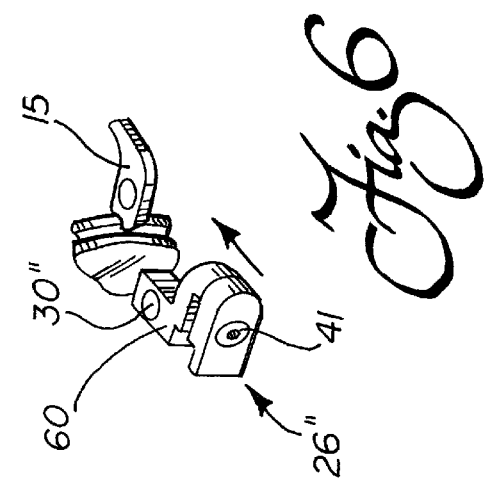
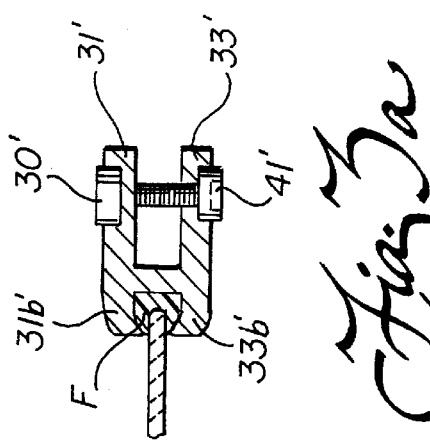
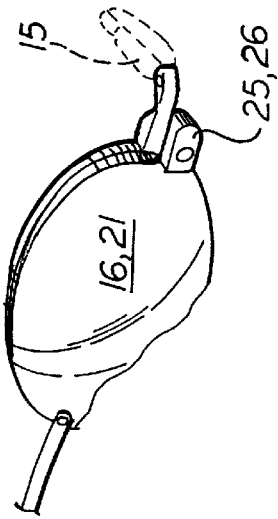
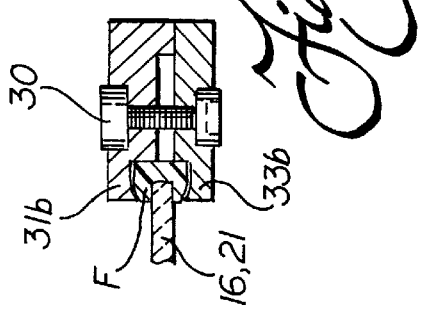
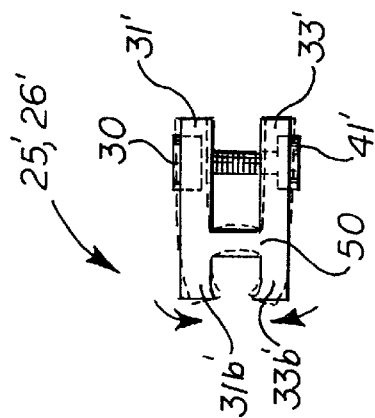

EYEGLASS DEVICES HAVING AUXILIARY EYEGLASSES WITH MAGNETIC CLAMP MOUNTING

BACKGROUND OF THE INVENTION

The present invention relates to eyeglass devices, and more particularly, to advancements in mounting of auxiliary eyeglasses with secondary lenses, such as sunglass lenses, on primary eyeglasses.

Various methods have been used in the past to attach auxiliary eyeglasses to primary eyeglasses. These methods include the use of permanently attached clips on the auxiliary eyeglasses, which fit around the outside of the frames of the primary eyeglasses. These clips are generally unstable and prone to being shaken loose, particularly when involved in an athletic activity. The clips are also not self-attaching so that on occasion one clip is left disengaged, thus leading to even more instability.

Advancements in the field have lead to the use of permanently attached magnetic members, which are imbedded in or at least integral with the frames, of both the auxiliary and primary eyeglasses. The members are in positions which generally correspond to one another. The magnetic member of the auxiliary eyeglasses is arranged for self engagement with the magnetic member of the primary eyeglasses so as to secure the auxiliary eyeglasses in place.

While use of such integrally attached magnetic members to secure auxiliary eyeglasses to primary eyeglasses is thus recognized as a notable improvement over the use of clips, this method results in several drawbacks. If the magnetic member is embedded in the frame of the eyeglasses, bulky frames are required. Also, the integral magnetic member tends to protrude excessively from the frame, so that it is unattractive, especially when the auxiliary eyeglasses are not attached to the primary eyeglasses. The use of permanently attached magnetic members also precludes the use of the primary eyeglasses by themselves or with auxiliary eyeglasses not expressly designed to mate with them.

Such prior art eyeglass devices with integral magnetic members are thus limited in use. This is particularly true with regard to modern thin frame or frameless eyeglasses since integrating the magnetic members has proven to be not feasible. Furthermore, the integral nature of magnetic members makes it impossible for the auxiliary lenses to be switched for different style frames, either for the primary eyeglasses or the auxiliary eyeglasses. Furthermore, making the magnetic members integral with the frames is relatively expensive to manufacture. Another factor that has proven to be an annoyance in the past is a lack of adjustment of the magnetic members. Once the members are made permanent, if a manufacturing tolerance is missed slightly, then the auxiliary eyeglasses do not fit perfectly, which can lead to considerable dissatisfaction.

A new approach is needed. Specifically, in lieu of permanent or integral magnetic members, it would be desirable to have removable magnetic members that can attach to both the primary and auxiliary eyeglasses. Also, it would be desirable not to be limited in terms of eyeglass styles, but indeed provide for universal conversion of any style, including the modern thin frame or frameless eyeglasses. With respect to the auxiliary eyeglasses, it would be desirable to have the ability to easily add magnetic members to several different ones. Thus, sunglasses with different color lenses can be chosen depending upon the nature of the sun on a particular day or even for color coordination with the user's clothing.

The new approach should also focus on being less expensive to manufacture. The magnetic members should be easily adapted for not only mounting onto any type of frame or eyeglass lenses, but also be easily adjusted to allow for a perfect fit between the primary and auxiliary eyeglasses.

To obtain a fuller understanding of the need for innovation in the manner described above, reference is made to my prior U.S. Pat. No. 5,416,537, issued May 16, 1995. While the invention of this patent has been highly successful, the integral or built-in nature of the magnets and/or the magnetic material limits the use, as identified above. Similarly, the recent U.S. Pat. No. 6,053,611 to Ku, issued Apr. 25, 2000, ends up with the same limitation of having the magnetic members permanently attached to the primary and auxiliary eyeglasses. There is no provision for using the magnetic members with any other frame or for adjustment to provide a better and more secure fit. The earlier patents to Chao U.S. Pat. No. 5,568,207, issued Oct. 22, 1996 and Nishioka, U.S. Pat. No. 5,648,177, issued Jun. 24, 1977 have the same problem as the '611 patent.

Accordingly, an improved eyeglass device overcoming the prior shortcomings inherent with integral or permanent magnetic members is provided. Specifically, primary eyeglasses that fit on the user's or wearer's head are mated with auxiliary eyeglasses having lenses which approximately correspond to the dimension and shape of the lenses on the primary eyeglasses. Rather than including permanent or integral magnetic members to hold the two eyeglasses together, one feature of my invention is to provide magnetic clamps adapted to grip the eyeglasses and then hold them together. The clamps are easily manually attached adjacent the periphery of each of the primary and secondary lenses. The magnetic clamps are universal and adapted to grip both eyeglasses, without concern over the thickness of the frames, or even in the case of frameless eyeglasses. The clamps can be attached for magnetic mating with each other and individually adjusted in a very simple operation. The auxiliary eyeglasses are at all times when in use securely held in place on the primary eyeglasses, even when the user is engaged in light athletic activities.

The magnetic clamps include a disc magnet on at least one of each pair of clamps which can cooperate with magnetic material on the other. The magnetic material can be a second magnet or material, such as a ferrous metal disc, that is capable of being magnetized. For maximum holding force, mating magnets are used on the primary and secondary eyeglasses.

Each of the clamps includes a retainer to enhance the gripping force. In both embodiments of the present invention, the clamps each include a pair of jaws to engage the eyeglasses and a mating pair of levers corresponding to the jaws. Preferably, each lever is simply an extension or fixed directly to the corresponding jaw. The levers serve an important function in the attachment and retention of the clamps.

For one preferred embodiment, a protrusion on the free end of one lever forms a fulcrum about which the lever pivots. A screw extending through one of said levers and threadedly engaging the other lever draws the jaws of the clamps together to provide the required gripping force. To save space, the disc magnet may include a hole to accommodate the tip of the screw. Alternatively, the clamp may include a web connecting the two levers with a screw being threaded through one lever and the end pressing against the other lever to force the levers apart and the jaws together as the web flexes. For easier installation, the retainer web extending between the levers is prestressed to resiliently force the jaws together and at least temporarily grip the eyeglasses for simplifying the mounting process. For example, as the levers are simultaneously actuated to flex the web, the jaws are attached to the frame of the eyeglasses and then released to the gripping and holding position. A screw retainer can also be used in this arrangement to force the levers further apart. This action serves to securely compress the jaws against the eyeglasses frames, or the lenses in the case of frameless models.

An additional feature is the provision of a deformable coating on the inside faces of the jaws for increasing the frictional holding action of the clamps. The clamps can extend outwardly and substantially parallel to the respective eyeglasses, or alternatively can extend out and over the top of the eyeglasses so that each pair can be made to magnetically mate in substantially a horizontal plane. This allows the auxiliary glasses to take advantage of enhanced holding by gravity.

The present invention also envisions an eyeglass conversion kit for primary eyeglasses. Auxiliary eyeglasses having secondary lenses that correspond to the primary lenses are included in the kit, along with magnetic clamps adapted to grip at least one of said primary eyeglasses and auxiliary eyeglasses adjacent the periphery of the lenses. The other of the eyeglasses may include magnetic material, such as other magnets, for mating with said one eyeglasses to securely hold the auxiliary eyeglasses in place. Preferably, the kit includes two pairs of the clamps with magnets to be attached to each of the primary and auxiliary eyeglasses. The kit also includes a retainer as a part of each clamp for the gripping force of the clamp or clamps on the respective eyeglasses.

Still other advantages and features of the present invention will become readily apparent to those skilled in this art from the following description wherein there is shown and described the preferred embodiments of this invention, simply by way of illustration of the currently conceived modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1 is a perspective view of the combination eyeglass device of the present invention with the clamps including a device for gripping being illustrated for manual attachment to the primary/auxiliary eyeglasses and the auxiliary eyeglasses being shown in turn directed for movement toward the mounted position on the primary eyeglasses;

FIG. 2 is an enlarged, exploded side view of a preferred embodiment of the magnetic clamp forming an important feature of the present invention;

FIG. 2a is an enlarged side view of the clamp of FIG. 2, but with the clamp and retainer parts shown assembled;

FIG. 2b is an enlarged cross sectional view of the clamp of FIG. 2, but with the clamp mounted on the frame of an eyeglasses;

FIG. 3 is an enlarged side view of an alternative embodiment of the magnetic clamp with the web retainer flexed in dashed line outline;

FIG. 3a is an enlarged cross sectional view of the clamp of FIG. 3 attached to an eyeglasses;

FIG. 4 is partial perspective view of the eyeglass device similar to FIG. 1, but illustrating the manner of use with frameless eyeglasses;

FIG. 5 is an enlarged cross sectional view of alternative jaws of the clamps of FIGS. 2–4 including a deformable coating for enhanced frictional holding; and FIG. 6 is a perspective view of an alternative clamp for the auxiliary eyeglasses extending out and over the top of the primary eyeglasses.

Reference will now be made in detail to the present preferred embodiment of the invention, an example of which is illustrated in the accompanying drawings.

DETAILED DESCRIPTION OF THE PREFERRED EMBODIMENT

With reference now to FIG. 1 of the drawings, the improved combination eyeglass device of the present invention is illustrated, and generally designated by the reference numeral 10. A primary eyeglasses 11 that are adapted to fit on the user's head include a frame F with a nose bridge 13, and a pair of pivotal ear pieces 14, 15. These primary eyeglasses do of course include primary lenses 16 that normally are corrective lenses provided by prescription to the user. Auxiliary eyeglasses 20 have matching lenses 21, which typically are a shaded color so as to serve as sunglasses. These lenses 21 approximately correspond to the dimension and shape of the lenses 16 of the primary eyeglasses 11.

In accordance with the present invention, instead of including permanent or integral magnetic members for mounting the auxiliary eyeglasses 20, at least one set of magnetic members in the form of clamps for the primary eyeglasses 11, and generally designated by the reference numeral 25, or one set of like members/clamps 26 for the auxiliary eyeglasses 20 are provided. In the preferred embodiment, both sets are magnetic clamps 25, 26. The action arrows extending from the side of each of the clamps 25, 26 indicate the general nature of the movement during installation on the respective eyeglasses. It will be realized that a significant feature of the present invention is thus to provide one or both sets of these magnetic clamps 25 and clamps 26 that are adapted to grip the eyeglasses 11, 20 and then securely hold them together (note center action arrow illustrating movement of the auxiliary eyeglasses 20 into the mounted position).

In the preferred embodiment, all four of the clamps 25, 26 are easily manually attached and adjusted adjacent the periphery of the lenses 16, 21, respectively. In the illustration of FIG. 1, the lenses 16, 21 that mate with each other are representative of modern, long oval lenses that are especially popular at the present time. A particular advantage is gained with use with eyeglasses having very thin frames F, as illustrated. Also, the clamps 25, 26 are universal in that gripping of different thickness frames by the same clamps is possible. Thus, a user can adapt the clamps for different eyeglasses, both primary and auxiliary, without concern over the thickness of the frames F within a reasonable range. The same universal nature of the clamps 25, 26 applies even in the case of frameless eyeglasses, as will be discussed more in detail below. By attachment of each of the individual pairs of clamps 25, 26 opposite each other, the clamps can be easily mated with each other. The magnetic force of the magnets on the clamps makes the eyeglasses 11, 20 virtually self-attaching. By a simple movement in one direction or the other with respect to the frames F, the clamps 25, 26 may be individually adjusted as a pair in a very easy and simple operation. Once moved into position, as shown in progress in FIG. 1, the auxiliary eyeglasses 20 are at all times securely held in place.

Each of the pair of magnetic clamps 25, 26 includes a disc magnet 30, that can be best viewed in the exploded view of the first preferred embodiment of the clamps 25, 26, as illustrated in FIG. 2. As indicated, when the clamps are used in pairs the opposite poles of the magnets 30 are facing each other (see FIG. 1). Of course, on one of the clamps 25, 26, magnetic material, such as a ferrous metal disc, can be substituted for the second magnet. However, for maximum holding force between the two or matched pair of clamps 25, 26, the two magnet combination is used.

The clamps 25, 26 of the first preferred embodiment include a first clamp member 31 having a projection 32 extending across one end. The projection mates with the end of the second clamp member 33, as shown in FIG. 2. In order to accommodate the magnet 30, a recess 35 is formed in the first member 31 and preferably the magnet 30 is force fit and/or glued into this recess, as illustrated by the action arrow in FIG. 2. At the bottom of the recess 35 is a tapped aperture 36.

The second or opposite clamp member 33 of this embodiment includes a recess 40 and a pass through hole for a retainer screw 41. The head of the screw 41 fits in a countersunk relationship within the recess 40 when the screw is inserted, as illustrated by the action arrow. Each of the clamp members 31, 33 include a respective lever portion, 31a, 33a and jaws 31b, 33b. Each lever 31a, 33a is an extension of the corresponding jaw 31b, 33b, respectively. As best shown in FIG. 2a, once the clamp members 31, 33 are assembled with the magnet 30 and the retainer screw 41, the operation of the clamp will be apparent. As the screw 41 is tightened within the threaded aperture 36, the jaws 31b, 33b are drawn together. Because of the protrusion 32 forming the fulcrum, the first clamp member 31 moves in a pivoting fashion, as shown by the action arrow. This brings the jaws 31b, 33b together to perform its clamping function. If necessary, the magnet 30 may be machined with a center opening to accommodate the end of the retainer screw 41. Also, the jaws 31b, 33b may, if desired, have an angled feature to focus the greatest gripping force toward the distal end of the clamp members 31, 33.

As best shown in cross section in FIG. 2b, the jaws 31b, 33b can easily grasp the thin or narrow frame F of the primary eyeglasses 11 and/or the auxiliary eyeglasses 20, including the lens 16 and/or 21.

A second embodiment of the clamp is shown in FIGS. 3 and 3a. In this embodiment, the clamp members 31', 33' are connected at the juncture with the jaws 31b' and 33b' by a flexible web 50. As illustrated in FIG. 3 in dashed line outline, by applying pressure to the lever portion of the clamp members 31', 33', the jaws 31b' and 33b' can flex in and out to perform a gripping function. In the version illustrated in FIG. 3, the web 50 does perform the retainer function once the clamp is placed in position on the frame F' (see FIG. 3a). However, in order to enhance the gripping and holding function, a retainer screw 41' in a threaded aperture in clamp member 33' can be utilized. In this particular arrangement, both jaws 31b' and 33b' perform a slight pivoting action. As will be apparent, the pivoting action toward the gripping position is activated by spreading the lever portions and thus flexing the web 50.

Within the broader aspects of the present invention, the web 50 may be prestressed so as to provide an inherent gripping function on the frame F (see FIG. 3a) by simply manually pressing the lever portions together and then releasing them. The extra gripping power of the retainer screw 41' is desirable in most instances. However, even when the retainer screw 41' is used, the flexibility of the web 50 can be used to advantage by initially attaching the clamps 25', 26' onto the frame, releasing the pinching force on the levers and then applying the retainer screw 41' by tightening it in the threaded aperture of the clamp member 33'.

In FIG. 4, a representation of attaching the clamps 25, 26 directly to a lens 16, 21 is illustrated. Either the embodiment of FIGS. 2–2b or FIGS. 3–3a, can of course be used. In this instance, or in other applications, the jaws 31b, 31b' and 33b, 33b' may include a deformable coating 55, across the gripping area (see FIG. 5). The deformable coating 55 may be a rubber compound, such as urethane or a soft plastic. In any case, the holding force of the jaws 31b, 31b' and 33b, 33b' is enhanced, especially as to the frictional holding ability. The jaws with the coating 55 have a particular advantageous application to the situation where the lenses 16, 21 are directly engaged by the clamps to avoid marring the lenses, as shown in FIG. 4.

The clamps 25, 26 may include an arm 60 that extends out and over the upper portion or top of the earpieces 14, 15, if desired (see FIG. 6). In this instance, the magnets 30" of the set of clamps 26" are thus both top mounted. As a result, gravity may assist in holding the auxiliary eyeglasses 20 in position on the primary eyeglasses 11 (see FIG. 1).

A commercial product utilizing the teachings of the present invention may be in the form of two pairs of magnetic clamps; one right-hand and one left-hand in each pair. This product would preferably include the magnets 30 in each clamp 25, 26 with the positive pole exposed in one and with the negative pole exposed in the other. The feature of the present invention that allows simple installation on a variety of combination eyeglass devices is one of the features that makes this product suitable for many users. This product can also be expanded to a full conversion kit by providing auxiliary eyeglasses with the magnetic clamps. Of course, within the broadest aspects, one of the magnetic members of each pair may be permanently attached so that only one set of clamps is required in the kit. For example, if magnets are attached directly to a frameless lens, then only one set of clamps needs to be supplied with such a conversion kit. Also as indicated above, broadly one of the sets of magnetic members of such a kit could be simply magnetic material that is able to be magnetized.

In summary, the present invention provides for a combination eyeglass device 10 that provides results and advantages not heretofore found in the art. The magnetic clamps 25, 26 are universal in that different frames and/or frameless eyeglasses can be adapted for magnetic attachment of the auxiliary eyeglasses 20. The clamps 25, 26 are economical to manufacture. The device 10 lends itself well to supply in a conversion kit. The clamps 25, 26 may be easily secured in place and can be adjusted so that the best fit of the auxiliary eyeglasses 20 on the primary eyeglasses 11 is assured. The concept of the present invention also does away with bulky frames, and eliminates one or more permanent or integral attachments that have hindered the acceptance of magnetic eye wear in the past.

The foregoing description of the preferred embodiments of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical applications to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An eyeglass device comprising:
   primary eyeglasses having primary lenses and adapted to fit on the user's head;
   auxiliary eyeglasses having secondary lenses which approximately correspond to the dimension and shape of the primary lenses; and
   a first and second pair of magnetic members including at least one magnetic clamp including a device to grip one of said eyeglasses adjacent the periphery of the respective primary and secondary lenses;
   said member pairs being positioned when attached for magnetically mating with each other to securely hold said auxiliary eyeglasses in place on said primary eyeglasses.

2. The eyeglass device of claim 1, wherein said magnetic members includes first and second magnetic clamps and a magnet is provided only on one of each pair of clamps and cooperates with magnetic material on the other clamp of said pair.

3. The eyeglass device of claim 2, wherein said magnetic material includes a magnet so as to provide mating magnets for maximum holding force.

4. The eyeglass device of claim 2, wherein each of said clamps includes a retainer to enhance the gripping force on the respective eyeglasses.

5. The eyeglass device of claim 4, wherein said device of said clamps each includes a pair of jaws to engage said eyeglasses and a pair of levers corresponding to said jaws for operating said jaws for gripping the respective eyeglasses.

6. The eyeglass device of claim 5, wherein each jaw is fixed to the corresponding lever.

7. The eyeglass device of claim 6, wherein is provided a protrusion on the free end of one lever for engaging the corresponding free end of the other lever to form a fulcrum, and a screw extending freely through one of said levers and threadedly engaging the other lever for drawing the jaws of the clamps together for gripping said eyeglasses.

8. The eyeglass device of claim 6, wherein said retainer includes a flexible web extending between said levers adjacent the juncture with said jaws and a screw threadedly engaging one lever and pressing against the other lever to force said jaws toward each other.

9. The eyeglass device of claim 6, wherein said retainer includes a flexible web extending between said levers adjacent the juncture with said jaws and said web being prestressed to resiliently force said jaws together gripping said eyeglasses.

10. The eyeglass device of claim 5, wherein the inside faces of said jaws include a deformable coating for increasing the frictional holding action of said clamps.

11. The eyeglass device of claim 2, wherein said eyeglasses are frameless, said device of said clamps gripping directly on said lenses.

12. The eyeglass device of claim 2, wherein said clamps extend outwardly from and substantially parallel to the respective eyeglasses.

13. The eyeglass device of claim 12, wherein clamps each include an extension extending over the upper portion of the respective eyeglasses for each pair to magnetically mate in substantially a horizontal plane to thereby take advantage of enhanced holding by gravity.

14. A mating pair of clamps for holding auxiliary eyeglasses on primary eyeglasses of a user, each clamp including a device for gripping adjacent the periphery of the respective eyeglasses and comprising:
   a magnet fixed on at least one of said clamps and cooperates with magnetic material on the other clamp of the pair,
   each clamp being manually attachable by a user of the eyeglasses to a respective one of said eyeglasses.

15. The clamps of claim 14, wherein said magnetic material includes a magnet so as to provide mating magnets for maximum holding force.

16. The clamps of claim 14, wherein each of said clamps includes a retainer to enhance the gripping force on the respective eyeglasses.

17. The clamps of claim 16, wherein said device includes jaws, the inside faces of said jaws include a deformable coating for increasing the gripping and frictional holding action of said clamps.

18. An eyeglass conversion kit for primary eyeglasses having primary lenses including:
   auxiliary eyeglasses having secondary lenses which approximately correspond to the dimension and shape of the primary lenses;
   at least one magnetic clamp including a device to grip one of said primary eyeglasses and said auxiliary eyeglasses adjacent to the periphery of the respective primary and secondary lenses; and
   the other of said primary and auxiliary eyeglasses including magnetic material for mating with said one eyeglasses to securely hold said auxiliary eyeglasses in place on said primary eyeglasses.

19. An eyeglass conversion kit of claim 18, wherein there are two pairs of said clamps with magnets to be attached to respective ones of said primary and auxiliary eyeglasses for magnetically mating with each other.

20. An eyeglass conversion kit of claim 18, wherein each of said clamps includes a retainer to enhance the gripping force on the respective eyeglasses.

* * * * *